US009232106B2

(12) United States Patent
Nishida et al.

(10) Patent No.: US 9,232,106 B2
(45) Date of Patent: Jan. 5, 2016

(54) APPARATUS AND METHOD FOR CONTROLLING THE APPARATUS (71) Applicant: CANON KABUSHIKI KAISHA, Tokyo (JP)

(72) Inventors: Tomofumi Nishida, Yokohama (JP); Nobutsune Kobayashi, Kawasaki (JP); Shinichi Yukiura, Yokohama (JP); Hideyuki Kido, Isehara (JP); Ryoji Kanoyadani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/056,224

(22) Filed: Oct. 17, 2013

(65) Prior Publication Data

US 2014/0036321 A1 Feb. 6, 2014

Related U.S. Application Data

(63) Continuation of application No. 12/848,855, filed on Aug. 2, 2010, now abandoned.

(30) Foreign Application Priority Data

Aug. 5, 2009 (JP) .................. 2009-182890

(51) Int. Cl.

| H04N 1/04 | (2006.01) |
|---|---|
| H04N 1/17 | (2006.01) |
| H04N 1/32 | (2006.01) |
| H04N 1/10 | (2006.01) |
| G05B 13/02 | (2006.01) |

(Continued)

(52) U.S. Cl.
CPC .................. *H04N 1/32* (2013.01); *H04N 1/047* (2013.01); *H04N 1/10* (2013.01); *H04N 1/1013* (2013.01); *H04N 1/193* (2013.01); *H04N 2201/04703* (2013.01)

(58) Field of Classification Search
CPC ....... H04N 1/04; H04N 1/1017; H04N 1/047; H04N 1/32; G06F 1/266
See application file for complete search history.

(56) References Cited

U.S. PATENT DOCUMENTS

2004/0119778 A1* 6/2004 Naito ............................... 347/37
2005/0189895 A1* 9/2005 Muroi ........................... 318/376

(Continued)

FOREIGN PATENT DOCUMENTS

JP 09237124 A * 9/1997 ............. G05D 13/62

OTHER PUBLICATIONS

JP 09237124 A, Sep. 1997, Japan Ando et al.*

*Primary Examiner* — Marivelisse Santiago Cordero
*Assistant Examiner* — Daryl Jackson
(74) *Attorney, Agent, or Firm* — Canon USA, Inc., IP Division (57) ABSTRACT

An apparatus for moving a unit to execute scanning includes a scanning unit including a motor, an encoder for outputting a signal according to movement of the unit, a detection unit for detecting a current supplied to the motor, a speed control unit for executing a speed control of the motor according to the signal output from the encoder and the current detected by the detection unit, a movement control unit for setting a threshold value, moving the unit by driving the motor, by using the speed control unit, and a current control unit for setting a value greater than the predetermined value according to the threshold value and value of the current detected by the detection unit at a predetermined timing during a time period while the unit is moving.

19 Claims, 11 Drawing Sheets (51) Int. Cl.
*G06F 1/26* (2006.01)
*H04N 1/047* (2006.01)
*H04N 1/193* (2006.01)

(56) References Cited

U.S. PATENT DOCUMENTS

| | | |
|---|---|---|
| 2005/0189898 A1* | 9/2005 | Muroi ............................ 318/560 |
| 2006/0033804 A1* | 2/2006 | Dan ............................... 347/230 |
| 2006/0133861 A1* | 6/2006 | Sakai ............................. 399/301 |
| 2006/0261765 A1* | 11/2006 | Prasanna ....................... 318/254 |
| 2007/0007925 A1* | 1/2007 | Yamane ........................ 318/600 |
| 2007/0223983 A1* | 9/2007 | Igarashi et al. ............... 400/323 |
| 2007/0241717 A1* | 10/2007 | Shibasaki et al. ............ 318/685 |
| 2008/0074716 A1* | 3/2008 | Yoshihisa ..................... 358/497 |
| 2008/0094018 A1* | 4/2008 | Yoshihisa ..................... 318/561 |
| 2008/0204491 A1* | 8/2008 | Iesaki ............................... 347/9 |
| 2009/0041440 A1* | 2/2009 | Yoshihisa ..................... 388/811 |
| 2009/0315503 A1* | 12/2009 | Yoshihisa et al. ............ 318/685 |
| 2010/0123751 A1* | 5/2010 | Iesaki ............................. 347/16 |
| 2010/0165424 A1* | 7/2010 | Maeda .......................... 358/498 |

\* cited by examiner

APPARATUS AND METHOD FOR CONTROLLING THE APPARATUS

CROSS REFERENCE OF RELATED APPLICATIONS

This application is a Continuation of U.S. patent application Ser. No. 12/848,855 filed on Aug. 2, 2010 which claims the benefit of Japanese Application No. 2009-182890 filed Aug. 5, 2009, which is hereby incorporated by reference herein in its entirety.

BACKGROUND OF THE INVENTION

1. Field of the Invention

The present invention relates to an apparatus configured to move a scanning unit to execute scanning and a method for controlling the apparatus. In particular, the present invention relates to an apparatus that employs a direct current (DC) motor as a driving source and a method for controlling the apparatus.

2. Description of the Related Art

A conventional image reading apparatus (image scanner) scans a document by using a scanner unit having a reading sensor while moving the scanner unit from an initial position of the scanner unit (a reference position) to read an image of the document. An image reading apparatus like this generally uses a position detection sensor as a unit for determining an initial position of the scanner unit (i.e., a home position sensor). A direction, in which a scanner unit is moved, is generally called a "main scanning direction" while a direction perpendicular to the main scanning direction is generally called a "sub scanning direction". In the sub scanning direction, a plurality of image reading sensors (e.g., a charge-coupled device (CCD) sensor) is generally provided.

As a control method for determining an initial position of a scanner unit by using a home position sensor, Japanese Patent Application Laid-Open No. 08-22087 discusses a method that uses a plurality of home position sensors provided in the sub scanning direction. When the method discussed in Japanese Patent Application Laid-Open No. 08-22087 is used in reading divided images, when the scanner unit reaches a position stored by the plurality of home position sensors, the scanner unit can return to a home position that is currently the nearest of the home positions that the scanner unit has gone over.

Furthermore, another conventional image reading apparatuses employ a DC motor as a driving source of the scanner unit.

As a method for detecting variation in the speed of moving the scanner unit and changes in the control to be executed thereafter, Japanese Patent Application Laid-Open No. 10-42584 discusses an image input and output apparatus configured, if the speed of the driving motor of the scanner unit is abnormal, to immediately stop the motor. More specifically, the image input and output apparatus discussed in Japanese Patent Application Laid-Open No. 10-42584 estimates the current speed range based on the history of variation of the speed of the motor. If it is determined that the current speed of the motor has gone out of the estimated speed range, the method discussed in Japanese Patent Application Laid-Open No. 10-42584 determines that the motor is not normally controlled and compulsorily stops the motor.

If the image reading apparatus described above does not have a sensor for detecting the position of the scanner unit, the image reading apparatus cannot use the sensor to determine the initial position of the scanner unit.

The conventional image reading apparatus described above initializes the position of the scanner unit by causing the scanner unit to contact the inner peripheral surface of the housing of the image input and output apparatus itself. After the position of the scanner unit is initialized in the above-described manner, the conventional image reading apparatus determines the initial (home) position by moving the scanner unit by a predetermined distance. The operation for initializing the position of the scanner unit is executed at the time of powering on the image reading apparatus, for example.

The scanner unit position initialization operation described above is executed by controlling the moving speed of the DC motor (the scanner unit driving source) to a low speed by limiting the value of the output current. Accordingly, it takes a long time to initialize the position of the scanner unit. In order to reduce the time taken for initializing the position of the scanner unit, it is necessary to increase the limit value of the output current to drive the scanner unit at a high speed.

However, even when the same limit value of the output current is set to a plurality of apparatuses, the driving torque transmitted to the DC motor during the operation for contacting the scanner unit may become high due to differences in the configuration of the apparatuses. If the driving torque becomes high, the DC motor that drives the scanner unit may continue rotating after the scanner unit actually contacts the inner peripheral surface of the housing of the image reading apparatus. As a result, an encoder, which is mounted on a rotational axis of the DC motor, may also rotate. Accordingly, in this case, the state of the scanner unit contacting the inner peripheral surface of the housing of the image reading apparatus cannot be detected.

Due to the above-described detection failure, the image reading apparatus cannot correctly determine the initial position of the scanner unit. The above-described problem may also arise in an apparatus other than the image reading apparatus configured to move the scanner unit.

SUMMARY OF THE INVENTION

According to an aspect of the present invention, an apparatus configured to move a unit to execute scanning by driving a motor, the apparatus includes an encoder configured to output a signal according to movement of the unit, an acquisition unit configured to acquire a value of current to be output to the motor, a speed control unit configured to execute control of a speed of the motor according to the signal output from the encoder and the value of the current acquired by the acquisition unit, a movement control unit configured to set a predetermined value as a threshold value, move the unit by driving the motor, by using the speed control unit, and a current control unit configured to set a value greater than the predetermined value according to the threshold value and the value of the current acquired by the acquisition unit at a predetermined timing during a time period in which the unit is being moved.

According to another aspect of the present invention, a method for controlling an apparatus including a motor, which is a source of driving a unit, and configured to move the unit, an encoder configured to output a signal according to movement of the unit, and a acquisition unit configured to acquire a value of current to be output to the motor, includes controlling a speed of driving the motor according to the signal output from the encoder and the value of the current acquired by the acquisition unit, moving the unit by driving the DC motor, by executing the speed control, and setting current to a value greater than the predetermined value according to the threshold value and the value of the current acquired by the acquisition unit at a predetermined timing during a time period in which the unit is being moved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DETAILED DESCRIPTION OF THE EMBODIMENTS

Various exemplary embodiments, features, and aspects of the invention will be described in detail below with reference to the drawings.

However, for relative arrangement of components of the present exemplary embodiment, the scope of the present invention is not limited to the following configuration unless otherwise particularly described.

Figure 1:
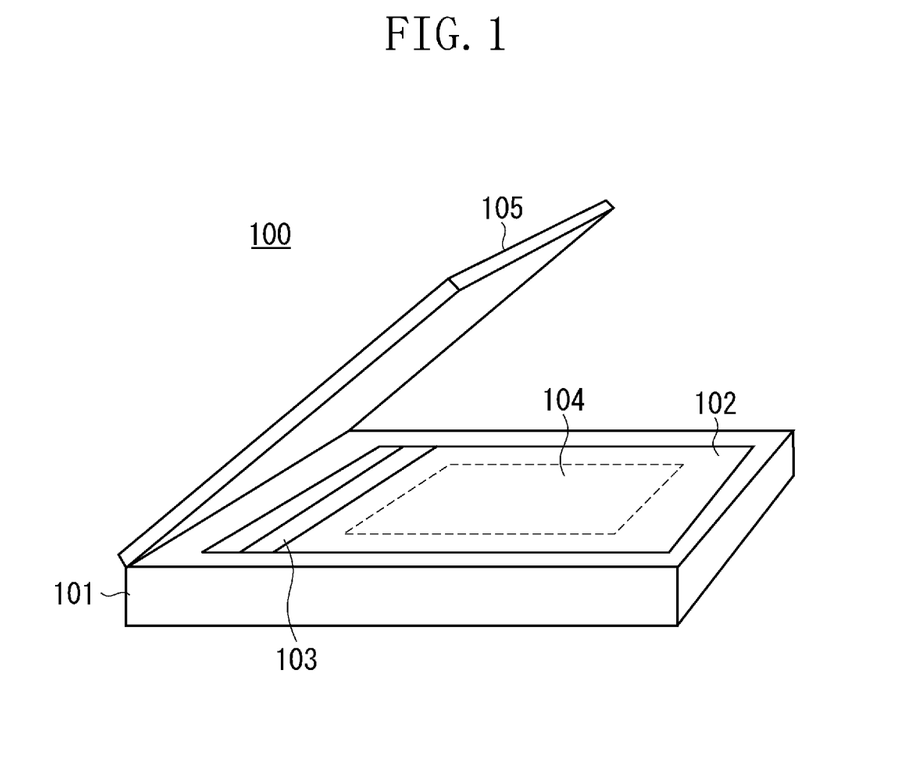
FIG. 1 illustrates an example of a mechanism of an image reading apparatus.

Now, an image reading apparatus according to an exemplary embodiment of the present invention will be described in detail below as an example of an apparatus configured to cause a unit, which is driven by a driving source, such as a motor, to execute scanning. FIG. 1 is a perspective view illustrating an example of an external appearance of the image reading apparatus.

Referring to FIG. 1, an image reading apparatus 100 includes a housing 101, which includes a control circuit, a document stand 102, a scanner unit 103, and a document cover 105.

Figure 2:
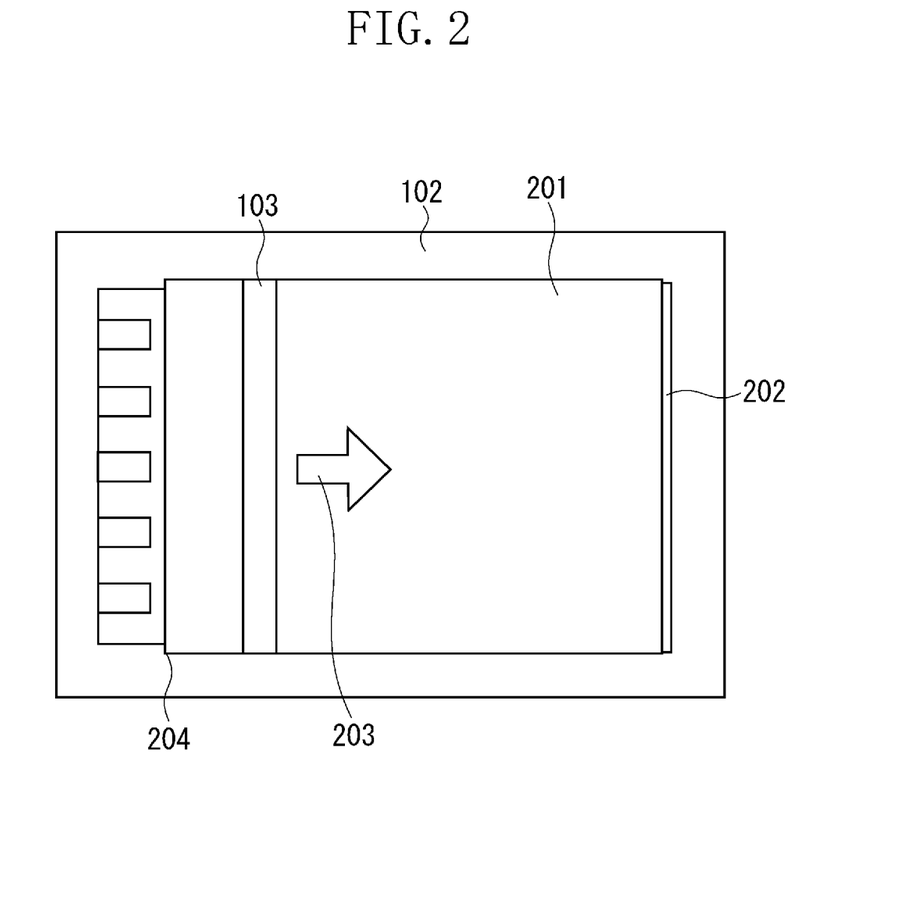
FIG. 2 is a plan view illustrating an example of the mechanism of the image reading apparatus viewed from a document stand.

FIG. 2 is a top view of the image reading apparatus 100 illustrated in FIG. 1. The example illustrated in FIG. 2 illustrates an exemplary hardware configuration of the image reading apparatus 100 inside the housing 101, which is viewed through a glass plate 201 of the document stand 102 over the document cover 105, which is opened in the example illustrated in FIG. 2. When a document is read, a user opens the document cover 105, places a document 104 on the glass plate 201 of the document stand 102, and then causes the scanner unit 103 to scan the document 104 to read.

Referring to FIG. 2, a home position 204 of the scanner unit 103 is set at a position to the left of the document stand 102. A contacting position 202 of the scanner unit 103 is set at a position opposite to the home position 204 of the scanner unit 103. During an operation for initializing the position of the scanner unit 103, the scanner unit 103 is moved in a direction indicated by an arrow 203 to reach the contact position 202. The scanner unit is moved in the main scanning direction, which is indicated by the arrow 203 in FIG. 2.

The image reading apparatus 100 illustrated in FIGS. 1 and 2, which is connected to a host computer (not illustrated), reads an image according to an instruction from the host computer and outputs data of the read image to the host computer. In each of the examples illustrated in FIGS. 1 and 2, the image reading apparatus 100 is a flatbed type independent (integrated) apparatus. However, the image reading apparatus 100 may be implemented by a scanner unit of a multifunction peripheral (MFP).

Figure 3:
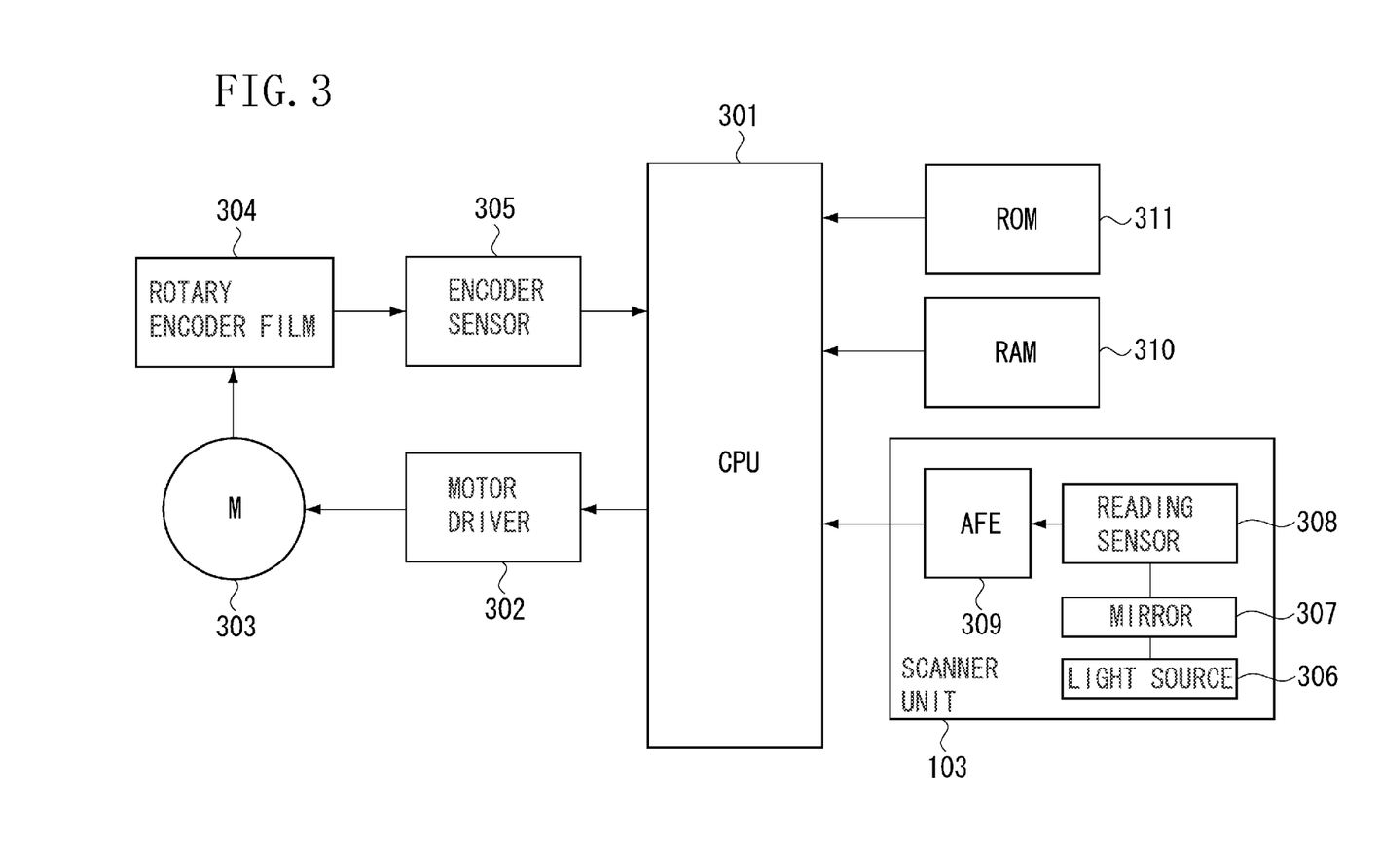
FIG. 3 is a block diagram illustrating an exemplary configuration of the image reading apparatus.

FIG. 3 is a block diagram illustrating an exemplary configuration of the image reading apparatus 100 related to control according to the present exemplary embodiment.

Referring to FIG. 3, when a central processing unit (CPU) 301 receives an instruction from the host computer for starting reading an image of a document, the CPU 301 starts a document image reading operation. When the image reading operation starts, a light source 306, which is included in the scanner unit 103, is lit and a DC motor 303, which is a driving source, starts rotating. In addition, the scanner unit 103 is driven by the DC motor 303 to be moved to irradiate the document with light.

Light reflected on the document is input to a reading sensor (CCD) 308 via a mirror 307. The reading sensor (CCD) 308 executes photoelectric conversion of the reflection light from the scanned document or light transmitted through the scanned document by using an analog front end (AFE) 309. An analog electric signal (image signal) generated by the photoelectric conversion is transmitted to the CPU 301. Then, the image signal is subjected to analog-to-digital (A/D) conversion. Furthermore, the A/D-converted signal is then subjected to image processing according to a program previously stored on a read-only memory (ROM) 311.

The CPU 301 stores image data generated in the above-described manner on a random access memory (RAM) 310. The scanner unit 103 is moved in the following manner. More specifically, the CPU 301 calls and executes a control program from the ROM 311 and executes feedback control. Furthermore, the CPU 301 drives the DC motor 303 via a motor driver 302.

A rotary encoder film 304 is read by using the encoder sensor 305. A signal acquired by reading the rotary encoder sensor 305 is output to the CPU 301. The CPU 301 receives the signal output from the DC motor 303 and acquires information about the speed of rotation of the DC motor 303 from the received signal. The CPU 301 executes the feedback control for driving the scanner unit 103 according to the speed information acquired in the above-described manner.

Figure 4:
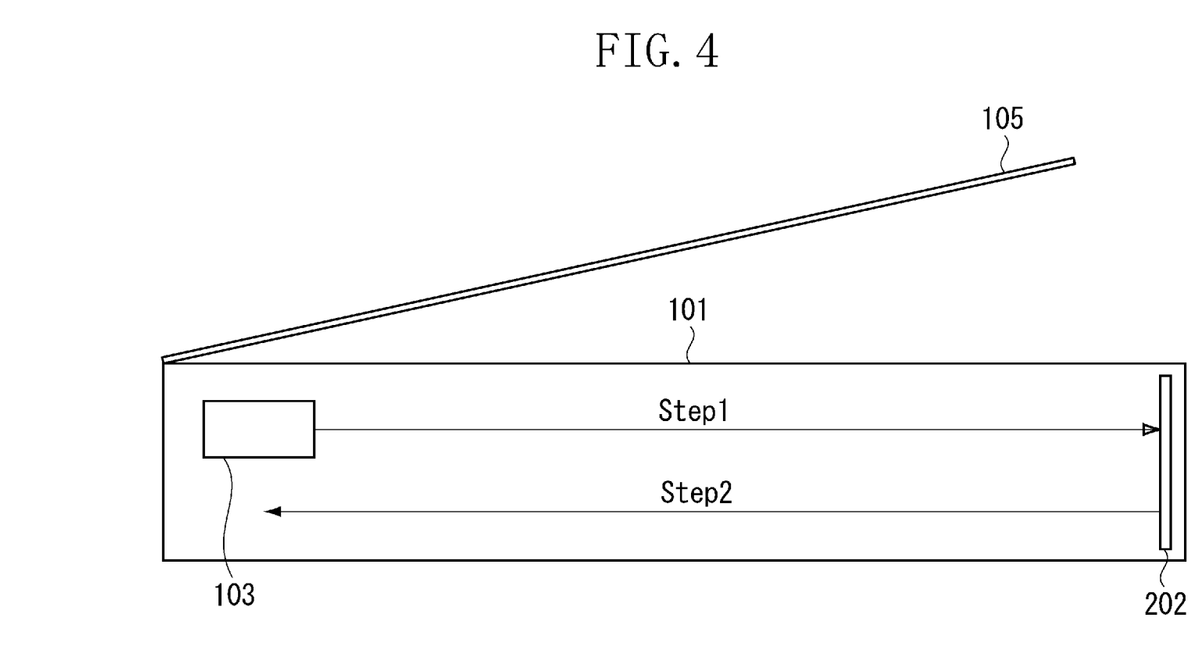
FIG. 4 illustrates an example of scanner unit contact processing.

FIG. 4 is a side cross section of the image reading apparatus 100, which schematically illustrates an operation for determining an initial position (home position) of the scanner unit 103. More specifically, FIG. 4 illustrates an example of scanner unit contact processing, which is executed to determine the initial position (home position) of the scanner unit 103. The scanner unit initial position determination processing includes the following two steps.

Referring to FIG. 4, in step S1, the CPU 301 moves the scanner unit 103 towards the contact position 202. When the scanner unit 103 is moved by the CPU 301 and reaches the contact position 202, the scanner unit 103 contacts an inner wall surface of the housing 101 of the image reading apparatus 100, which exists at the contact position 202. In the present exemplary embodiment, an operation for abutting the scanner unit 103 onto the inner wall surface of the housing 101 of the image reading apparatus 100 is referred to as "(to) contact" or "contact operation".

Whether the scanner unit 103 has reached the contact position 202 (i.e., whether the scanner unit 103 has contacted the inner wall surface of the housing 101 of the image reading apparatus 100) is determined according to the speed information acquired by using the encoder sensor 305. If it is determined that the scanner unit 103 has reached the contact position 202, the scanner unit 103 cannot be moved any further in this state. Accordingly, in this state, the CPU 301 acquires a value "0 [inch/sec]" as the speed information.

If it is determined that the scanner unit 103 has reached a target position (the contact position 202) according to the acquired speed information, the CPU 301 suspends the driving of the scanner unit 103 and ends the scanner unit contact operation. Then the processing advances to step S2. However, the present exemplary embodiment is not limited to this. More specifically, it is also useful if the CPU 301 determines that the scanner unit 103 has reached the target position if the value of the acquired speed information is equal to or less than a predetermined value.

After it is determined that the operation for causing the scanner unit 103 to contact the inner wall surface of the housing 101 of the image reading apparatus 100 has been completed, in step S2, the CPU 301 executes control for moving the scanner unit 103 in a direction opposite to the direction of moving the scanner unit 103 in step S1 at a predetermined speed. In the present exemplary embodiment, a position distant from the contact position 202 by a predetermined distance is referred to as a "home position of the scanner unit 103".

By executing the processing in steps S1 and S2 described above, the CPU 301 determines the initial position (home position) of the scanner unit 103.

Figure 5:
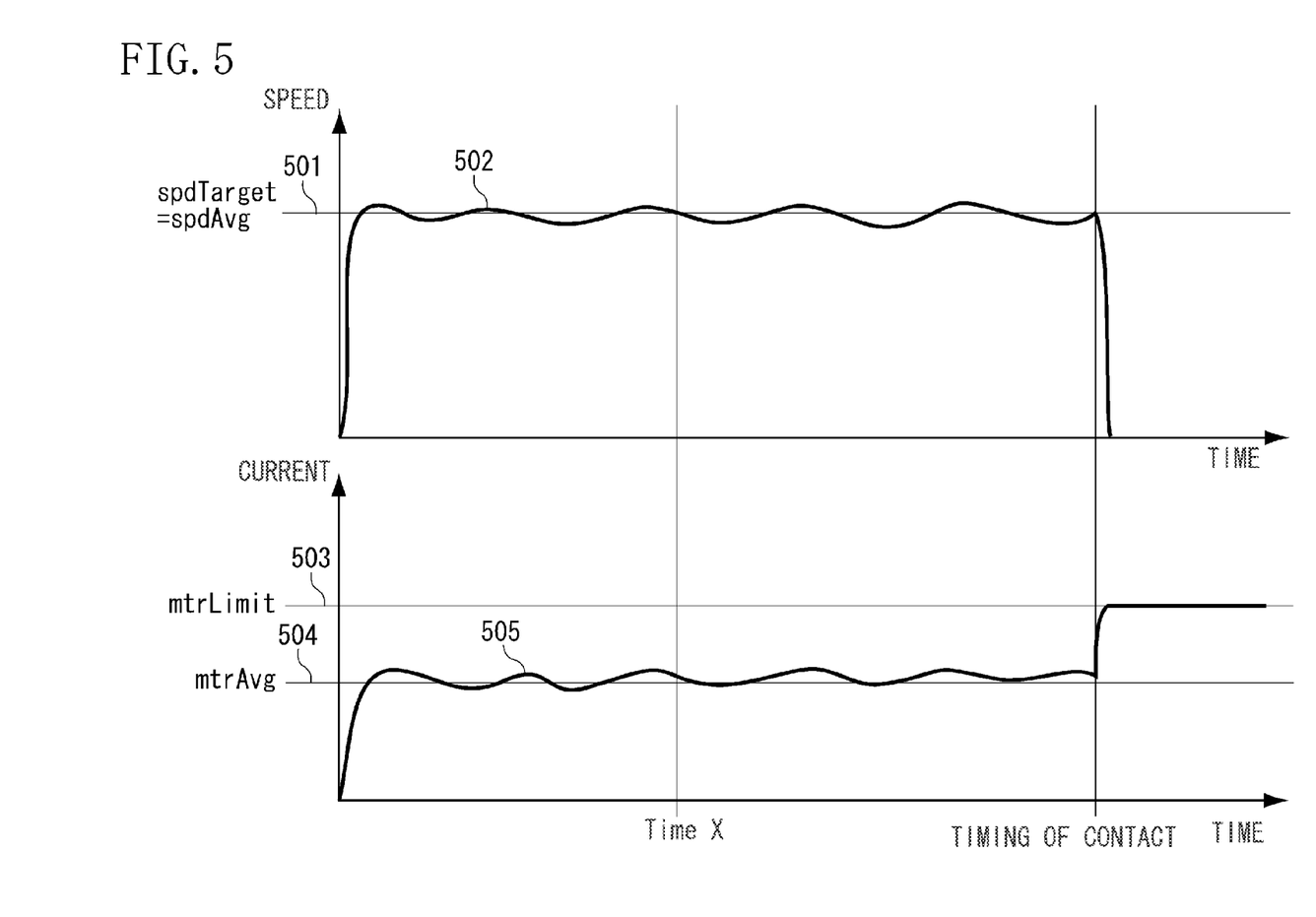
FIG. 5 is a graph illustrating exemplary variations in the speed of driving a scanner unit and a current applied to a motor when the scanner unit is driven according to a target speed, which has been set at the time of starting moving the scanner unit.

Now, the scanner unit contact operation, which is executed by the image reading apparatus 100 having the above-described configuration, will be described in detail below. FIG. 5 is a graph illustrating exemplary variations in the speed of driving the scanner unit 103 and a current supplied to the DC motor 303 when the scanner unit is driven and moved at a target speed spdTarget [inch(es)/sec], which has been set at the time of starting moving the scanner unit. Referring to FIG. 5, time is taken on its horizontal axis while the speed and the value of current are taken on the vertical axis, respectively.

In the example illustrated in FIG. 5, after setting the target speed spdTarget and an output current limit value mtrLimit [A], the CPU 301 starts the scanner unit contact operation. The moving speed of the scanner unit 103 is measured during a time period from the start of moving of the scanner unit 103 to time t (=Time_X [sec]). In the present exemplary embodiment, the CPU 301 calculates an average value of the values of the moving speed of the scanner unit 103 ("spdAvg" [inches/sec]), which are measured during the time period described above. In addition, the CPU 301 calculates an average value of values of the supplied current ("mtrAvg" [A]), which are also measured during the above-described time period. After that, if it is determined that the value of the speed acquired based on the output from the encoder sensor 305 is "0" [inch/sec], which indicates that the moving of the scanner unit 103 has been stopped, then the CPU 301 determines that the scanner unit 103 has contacted the inner wall surface of the housing 101 of the image reading apparatus 100.

If variation of speed 502 and variation of the value of the supplied current 505 are measured, it is indicated that the target speed spdTarget, which has been set at the time of starting moving the scanner unit 103, and an average speed value spdAvg 501, which is an average value of the values of the speed of moving of the scanner unit 103 having been measured during a time period from the start of moving of the scanner unit 103 to the time t (=Time_X), have the same value. In addition, a value of an average supplied current mtrAvg 504 indicates that the value of the output current has not reached an output current limit value ("mtrLimit") 503.

In the example illustrated in FIG. 5, the scanner unit 103 is moved at the target speed spdTarget. Accordingly, it is understood that the output current limit value ("mtrLimit") 503, which has been set at the time of starting driving (moving) the scanner unit 103, is an appropriate value uniquely and particularly to the image reading apparatus 100. On the other hand, if the target speed spdTarget is set higher than the above-described value for the individual image reading apparatus 100, then the driving torque generated by the DC motor 303 may become too high, although it is not in the example illustrated in FIG. 5. Accordingly, it is understood that the target speed spdTarget illustrated in FIG. 5 is an appropriate value for the individual image reading apparatus 100.

Figure 6:
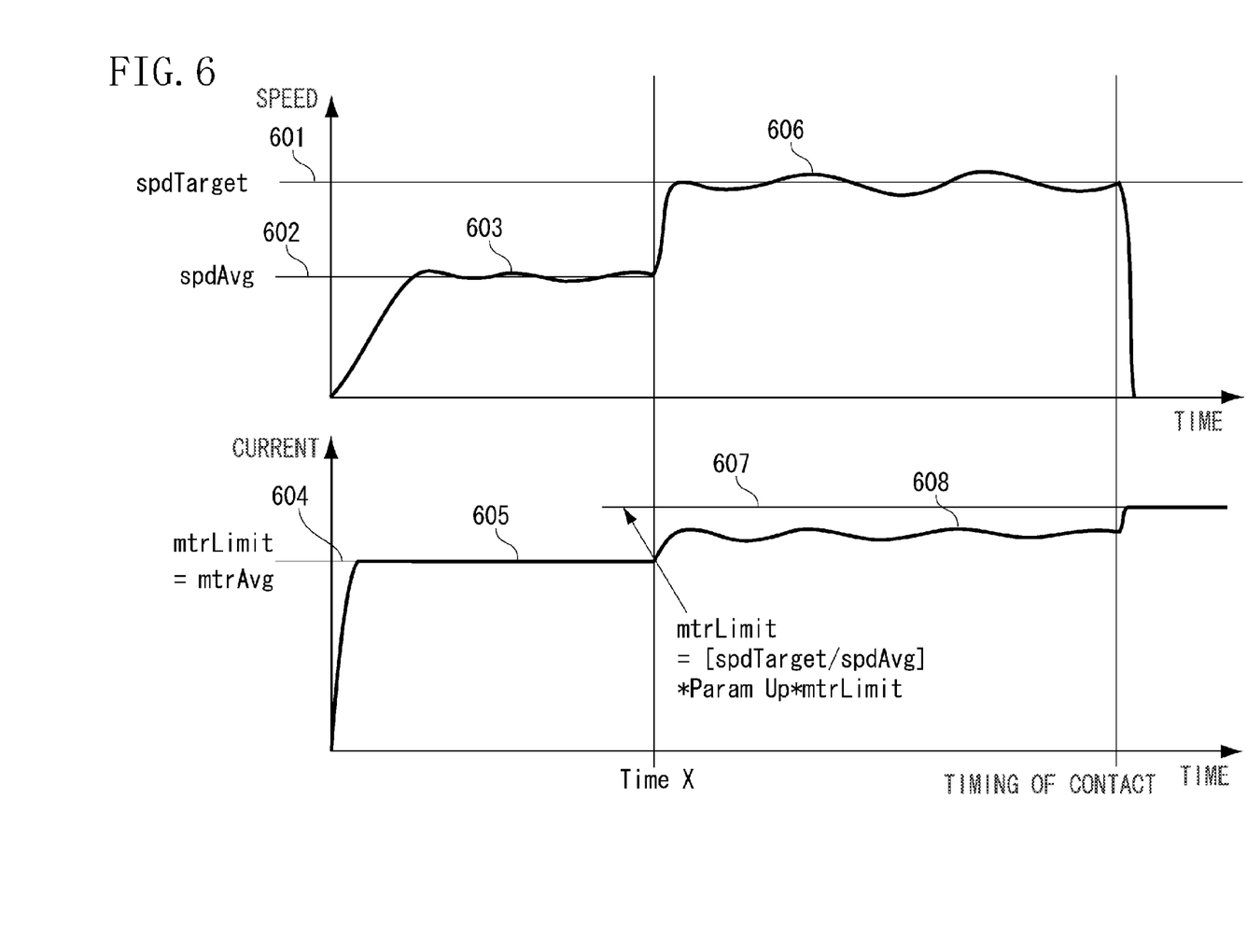
FIG. 6 is a graph illustrating an example of a relationship between the varied speed and the applied current when the speed of driving the scanner unit has not reached the target speed and the limit value of the current to be output has been reset.

FIG. 6 illustrates exemplary variation of the scanner unit driving speed and variation of supplied current in the case where an average value spdAvg [A] of the values of the speed of moving the scanner unit 103, which have been measured during a time period from the start of moving the scanner unit 103 to the time t (=Time_X) [sec], has not reached a target speed spdTarget [inches/sec] after starting moving the scanner unit 103.

In the example illustrated in FIG. 6, similarly to the example illustrated in FIG. 5, time is taken on the horizontal axis while the speed and the value of current are taken on the vertical axis, respectively. In the example illustrated in FIG. 6, an average applied (supplied) current value ("mtrAvg") 605 has a value illustrated in FIG. 6, then it is indicated that the scanner unit 103 moves at an average speed spdAvg 602 during the time period up to the time t (=Time_X) [sec]. In the present exemplary embodiment, it is supposed that the average speed spdAvg 602 has a value lower than the value of a target speed spdTarget [inches/sec] 601.

If it is determined that spdTarget>spdAvg, then the current as high as the output current limit value mtrLimit has been applied (supplied) to the DC motor 303 to move the scanner unit 103. In addition, the average applied (supplied) current value ("mtrAvg") 605 and an output current limit value ("mtrLimit") 604 have the same value. In the example illustrated in FIG. 6, the individual image reading apparatus 100 is capable of increasing the speed of moving the scanner unit 103 up to the target speed spdTarget [inches/sec] 601. Accordingly, it is useful if the output current limit value ("mtrLimit") 604 is sufficiently higher than the value of the current to be supplied when the speed of moving the scanner unit 103 is raised up to spdTarget.

If the output current limit value ("mtrLimit") 604 is sufficiently higher than the value of the current to be supplied when the speed of moving the scanner unit 103 is raised up to spdTarget (hereinafter this state will be simply referred to as "if the output current limit value ("mtrLimit") 604 is sufficiently high"), the CPU 301 multiplies the output current limit value ("mtrLimit") 604 by a coefficient, which is calculated by an expression "spdTarget (target speed)/spdAvg (average scanner unit moving speed)". Furthermore, the CPU 301 multiplies the result of the above-described multiplication by a conversion efficient "Param_UP". In the present exemplary embodiment, the conversion efficient "Param_UP" is used for increasing the difference (margin) of the output current limit value ("mtrLimit") 604 from the value of the current to be supplied when the speed of moving the scanner unit 103 is raised up to spdTarget. Moreover, the CPU 301 updates the output current limit value ("mtrLimit") 604 with the newly calculated value, which is calculated by executing the above-described multiplication operations. In addition, the CPU 301 drives the scanner unit 103 according to the updated output current limit value ("mtrLimit") 604.

When driving the scanner unit 103 is driven as described above, the speed of moving the scanner unit 103, which is controlled according to the updated output current limit value ("mtrLimit") 604, reaches the target speed spdTarget 601. The example illustrated in FIG. 6 indicates a scanner unit moving speed 606, which has been changed by updating the output current limit value. In addition, FIG. 6 also indicates an example of an output current limit value 607, which has been updated. In addition, the example illustrated in FIG. 6 illustrates a supplied current 608, which has been changed by updating the output current limit value.

As described above, the CPU 301 according to the present exemplary embodiment can update the output current limit value, which has been set at the time of starting moving the scanner unit 103 appropriately and uniquely to the individual image reading apparatus 100 according to the relationship between the target speed and the average scanner unit moving speed, which is the average of values of the moving speed that have been measured during the time period after starting moving up to the time t (=Time_X). Accordingly, the present exemplary embodiment can drive the scanner unit 103 at a high speed, and reduce the time taken for executing the scanner unit contact operation. In addition, the present exemplary embodiment having the above-described configuration can determine the initial position (home position) of the scanner unit 103 of each individual image reading apparatus 100 regardless of mechanical differences between the apparatuses.

Figure 7:
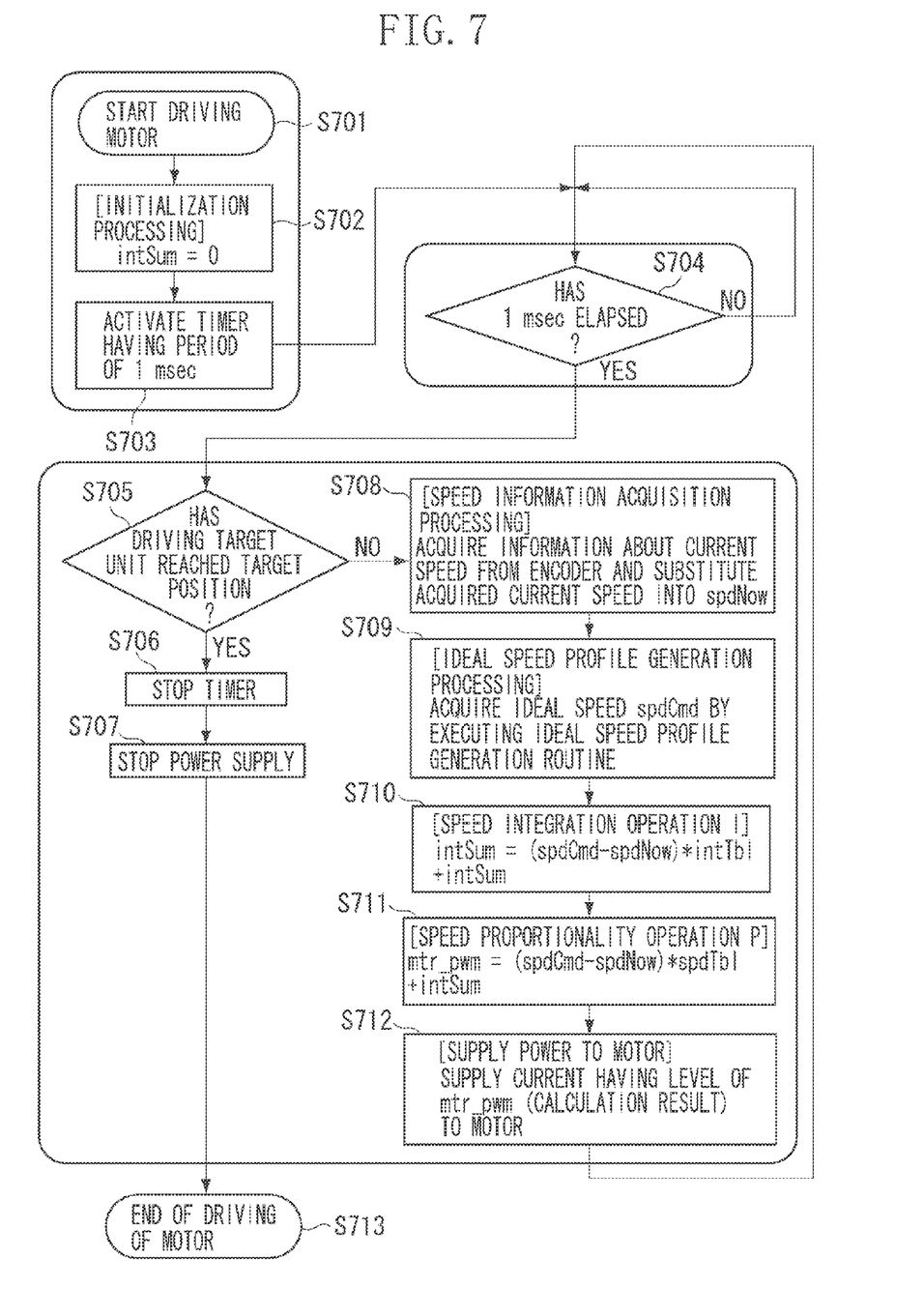
FIG. 7 is a flow chart illustrating an example of processing for executing general feedback control on the speed.

FIG. 7 is a flow chart illustrating exemplary feedback control (servo control) of the scanner unit moving speed. The control is executed for controlling the driving of the DC motor 303, which is the driving source of driving the scanner unit 103. In the example illustrated in FIG. 7, processing in steps S701 through S703 is processing that belongs to a layer of an image reading control task while processing in steps S704 through S713 is processing belonging to a layer of a timer handler, in terms of the software configuration of the present exemplary embodiment.

Referring to FIG. 7, in step S701, the CPU 301 starts processing for driving the DC motor 303, which is included in the control of the image reading operation. In step S702, the CPU 301 initializes a variable intSum. In the present exemplary embodiment, the variable "intSum" is a variable corresponding to the amount of integral compensation, which is calculated by integration executed during the feedback control. In step S703, the CPU 301 activates a timer handler for executing the feedback control (the timer handler of the image reading apparatus 100 has a period of 1 msec). Then, the processing in the task layer ends. Thereafter, by executing timer processing in step S704, the CPU 301 executes each processing in step S705 and subsequent steps every 1 msec.

In step S705, the CPU 301 determines whether the driving target unit (i.e., the scanner unit 103 in the present exemplary embodiment) has reached the target position. If it is determined that the scanner unit 103 has reached the target position (YES in step S705), then the processing advances to step S706. In step S706, the CPU 301 stops the timer. In step S707, the CPU 301 discontinues (stops) the supply of current to the DC motor 303. Then, the processing advances to step S713. In step S713, the CPU 301 ends the DC motor driving processing. However, the present invention is not limited to this. More specifically, as another aspect of the present invention, it is also useful if the CPU 301, in step S707, executes control for changing the value of the supplied current to a predetermined value so that the scanner unit 103 is not moved from the target position.

On the other hand, if it is determined that the scanner unit 103 has not reached the target position yet (NO in step S705), then the processing advances to step S708. In step S708, the CPU 301 acquires information about the scanner unit moving speed (hereinafter referred to as "speed information"). More specifically, in step S708, the CPU 301 acquires current speed information from the encoder sensor 305 and substitutes the acquired current speed information into a variable spdNow. In step S709, the CPU 301 executes a routine for generating an ideal speed profile. More specifically, in step S709, the CPU 301 acquires ideal speed information spdCmd, which is information about the ideal speed at the time of the current stage of the processing illustrated in FIG. 7. The ideal speed profile can be easily generated by integration of a speed command profile. That is, the ideal speed profile can be generated by a publicly known method. Accordingly, the detailed description thereof will not be made here.

Calculations in processing in steps S710 and S711 are examples of proportional-integral-derivative (PID) control. In the PID control used in the present exemplary embodiment, feedback control is applied in controlling the speed of moving the scanner unit 103. In step S710, the CPU 301 executes processing for executing integration in speed servo control. More specifically, in step S710, the CPU 301 calculates an amount of delay in the speed based on a difference between the speed command value spdCmd and the current speed information spdNow. Furthermore, the CPU 301 multiplies the calculated speed delay amount by an integral gain coefficient intTbl. Moreover, the CPU 301 adds the result of the multiplication by the integral gain coefficient intTbl to an integral compensation amount intSum, which has been calculated in the last interrupt by the timer having the period of 1 msec. In the above-described manner, the CPU 301 newly calculates the integral compensation amount intSum, which is the result of the integration.

In step S711, the CPU 301 executes a proportional operation in the speed servo control and then executes processing for determining the output current value. More specifically, in step S711, the CPU 301 calculates the difference between the speed command value spdCmd and the current speed information spdNow, and calculates the amount of delay of the speed based on the difference calculated in the above-described manner. Furthermore, the CPU 301 multiplies the calculated delay in the speed by an integral gain coefficient of the speed intTbl. Moreover, the CPU 301 adds the result of the integral operation intSum to the result of the proportional operation to acquire the output current value mtr_pwm.

In step S712, the CPU 301 executes control for supplying the current corresponding to the value of the mtr_pwm, which is the result of the above-described calculation, to the DC motor 303. After that, the processing returns to step S704. In step S704, the CPU 301 executes processing of another task until a time period of 1 msec elapses.

Figure 8A:
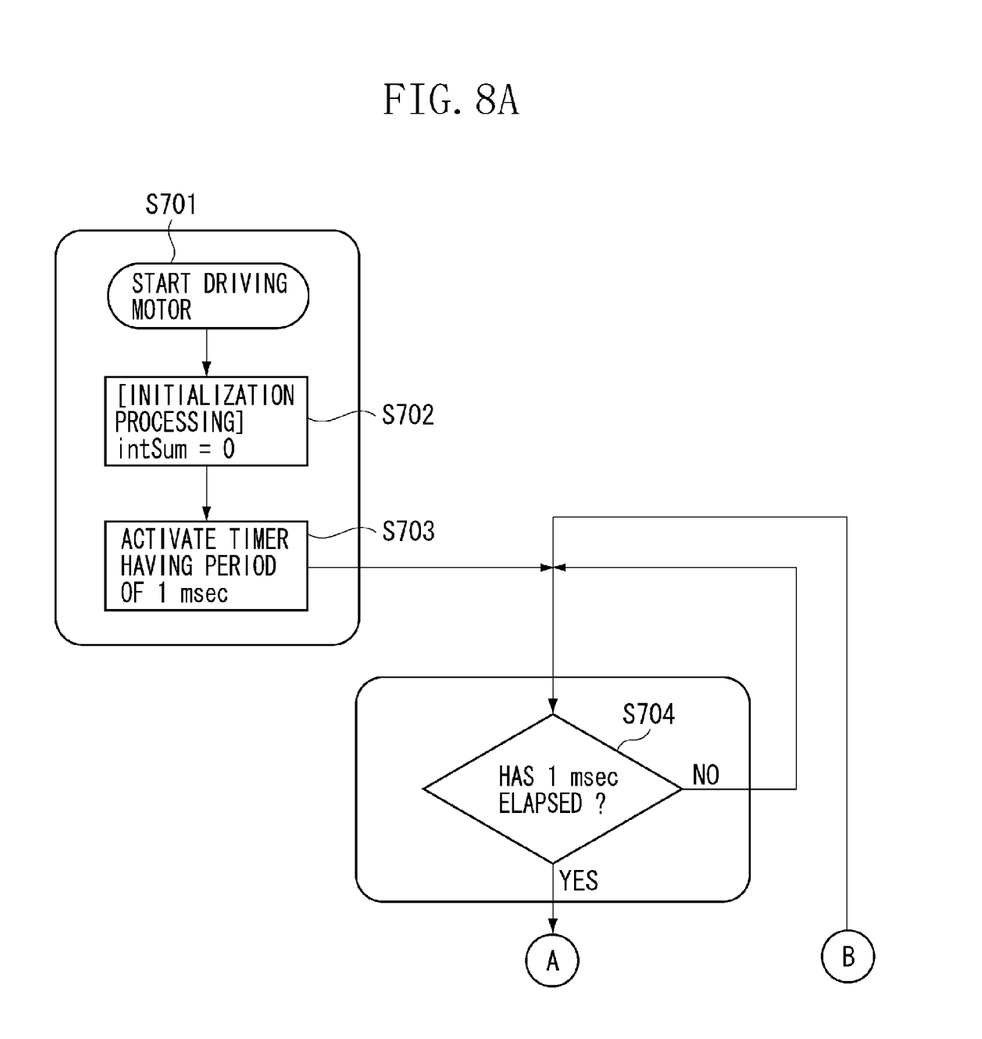
FIGS. 8A and 8B are flow charts illustrating an example of processing for executing feedback control on the speed of moving the scanner unit, which additionally includes a calculation that enables execution of processing in which an output current is limited.
Figure 8B:
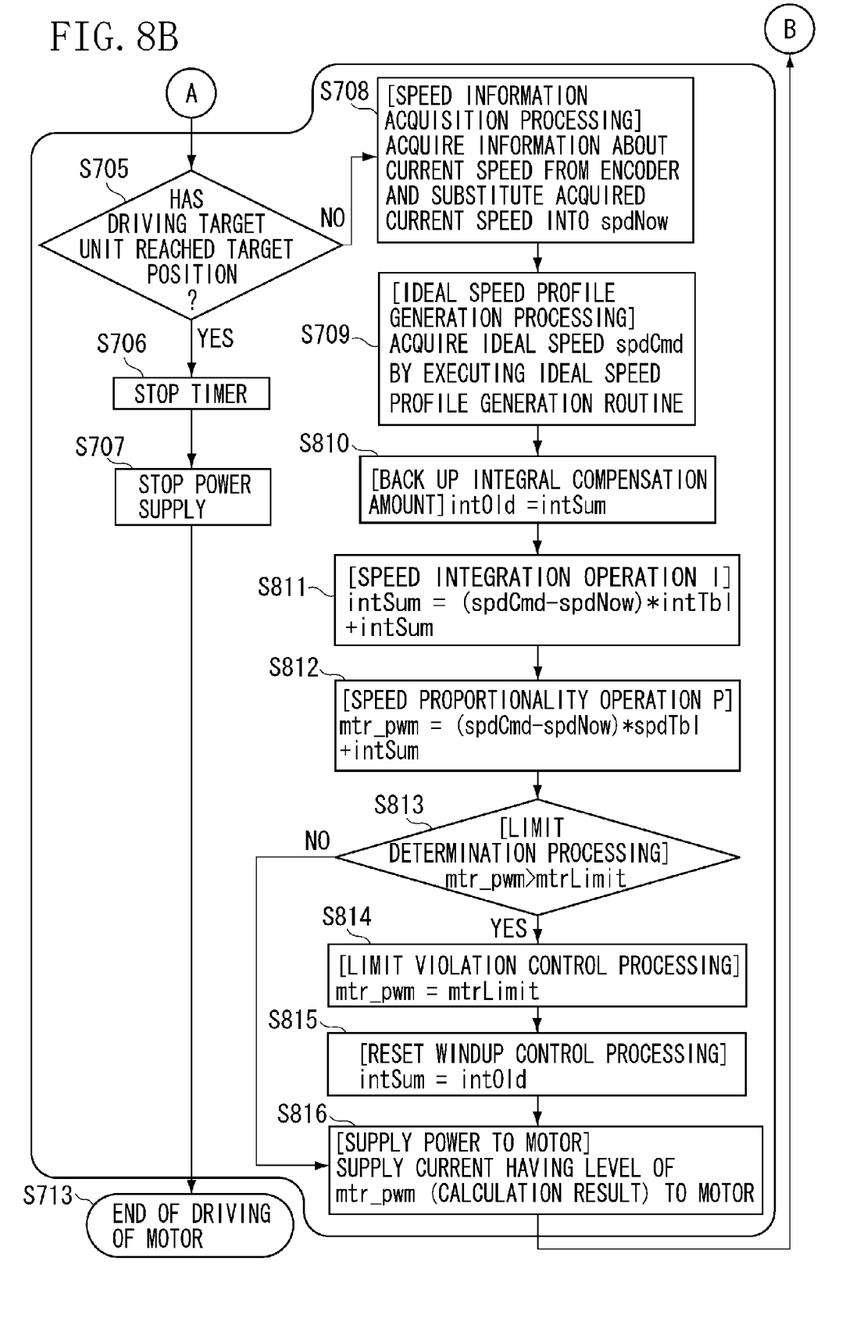

FIGS. 8A and 8B (collectively referred to as FIG. 8) are flow charts illustrating an example of processing for executing feedback control on the speed of moving the scanner unit 103, which includes a calculation that enables execution of processing in which an output current is limited in addition to the feedback control for controlling the scanner unit moving speed described above with reference to FIG. 7. In the example illustrated in FIG. 8, processing similar to that described above with reference to FIG. 7 is provided with the same step reference number as the corresponding processing illustrated in FIG. 7. Accordingly, the description thereof will not be repeated here. In the following description, processing in steps S810 through S816, which is uniquely included in the processing illustrated in FIG. 8, only will be described in detail.

Referring to FIG. 8, in step S810, the CPU 301 temporarily copies (stores) the result of the integral operation intSum into a backup variable area intOld. The integral operation result intSum itself is to be overwritten in subsequent processing. However, because the integral operation result intSum may be used again in subsequent processing, the CPU 301 backs up the integral operation result intSum in the backup variable area intOld as an old integral compensation amount. Calculations in processing in steps S811 and S812, which is similar to the processing in steps S710 and S711 illustrated in FIG. 7, are examples of the PID control, which is a publicly known control. In the PID control used in the present exemplary embodiment, feedback control is applied in controlling the position of the scanner unit 103.

Processing in step S813 is remarkably different from the processing illustrated in FIG. 7 and that illustrated in FIG. 8. More specifically, in step S813, the CPU 301 compares the output current value mtr_pwm with a predetermined threshold value mtrLimit. In step S813, the CPU 301 determines whether the output current value mtr_pwm is greater than the predetermined threshold value mtrLimit. If it is determined that the output current value mtr_pwm is equal to or smaller than the predetermined threshold value mtrLimit (NO in step S813), then the processing advances to step S816. In step S816, the CPU 301 executes control for supplying the current corresponding to the value of the calculation result mtr_pwm to the DC motor 303.

On the other hand, if it is determined that the output current value mtr_pwm is greater than the predetermined threshold value mtrLimit (YES in step S813), then the processing advances to step S814. In step S814, the CPU 301 sets the threshold value mtrLimit as the output current value mtr_pwm.

However, if the above-described processing is executed as it is, a problem so-called "reset windup" may arise. More specifically, the problem "reset windup" may arise if the output of the calculation result exceeds a limit that has been set to the output in a system that is a control target. If an output has exceeded its limit value, feedback control is not effective. To paraphrase this, in this case, the feedback control fails and the output does not increase in proportion to the increase of the integral compensation amount. If the integral operation is continued in this state, the integral compensation amount is wound up.

As a result, the output does not decrease even if a deviation starts to decrease and the integral compensation amount is reduced. This is because the wound-up integral compensation amount is cancelled by reduction processing. To paraphrase this, the feedback control becomes ineffective for a time period necessary for reducing the wound-up integral compensation amount. Accordingly, in this case, an overshoot of the result of the control may become too great.

In order to address the problem described above, the present exemplary embodiment uses a publicly known and widely used method in which if the output of the result of the calculation operation reaches its limit, the integral operation for further increasing the output of the calculation result is stopped. More specifically, in step S815, the CPU 301 stops the integral operation by substituting the integral compensation amount intSum with the backup variable intOld. After that, the processing advances to step S816. In step S816, the CPU 301 supplies the current corresponding to the value of the calculation result mtr_pwm to the DC motor 303. Then, the processing returns to step S704. In step S704, the CPU 301 executes processing of another task until a time period of 1 msec elapses.

Figure 9:
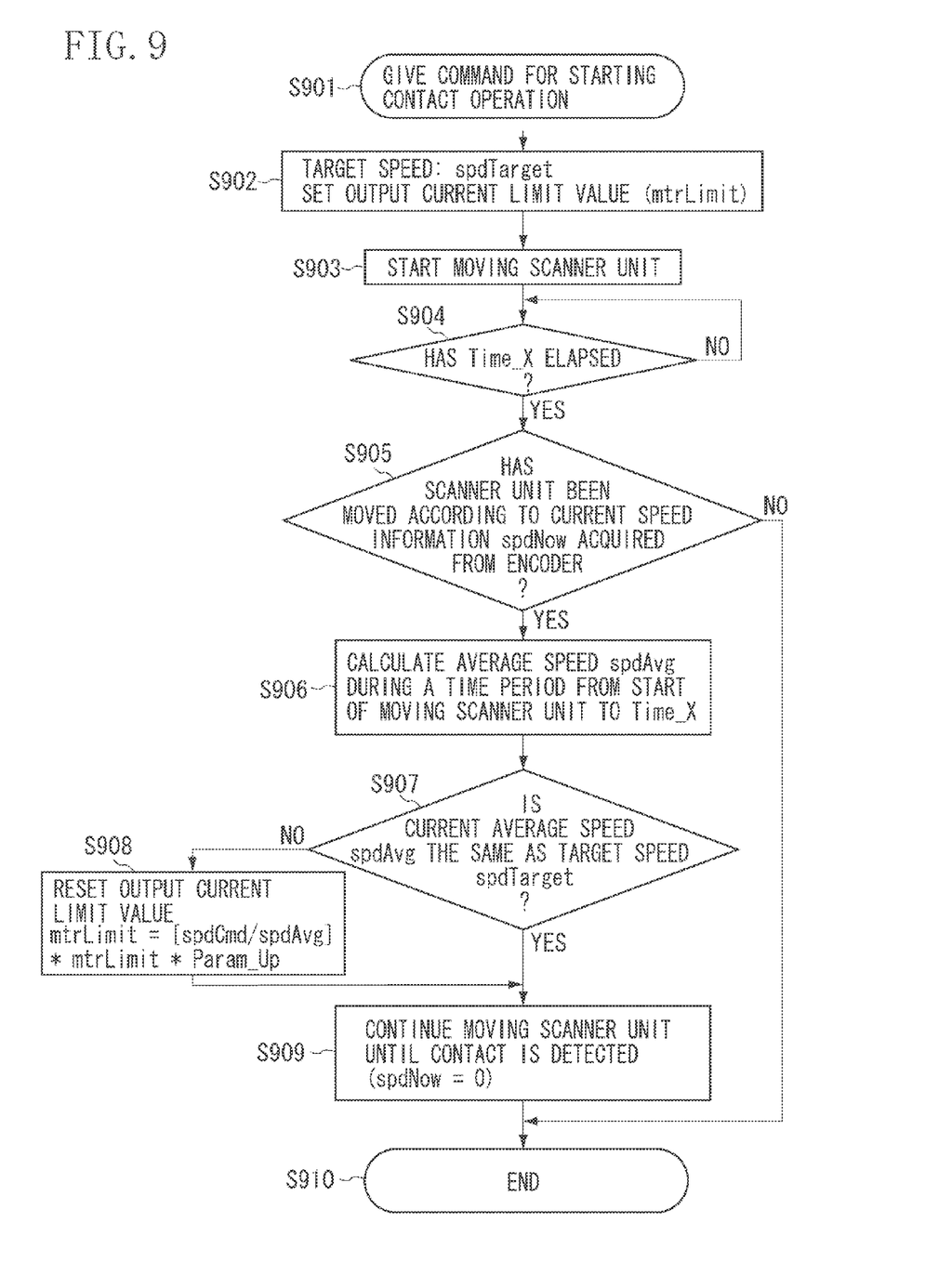
FIG. 9 is a flow chart illustrating an example of processing of a method that is characteristic to an exemplary embodiment of the present invention.

FIG. 9 is a flow chart illustrating an example of processing for causing the scanner unit 103 to contact the inner wall surface of the housing 101 of the individual image reading apparatus 100. Referring to FIG. 9, in step S901, the CPU 301 gives a command for starting the scanner unit contact operation. In step S902, the CPU 301 sets the target speed spdTarget [inches/sec] and the output current limit value mtrLimit [A], which have been previously set, to a built-in register, which is built in the CPU 301.

In step S903, in order to cause the scanner unit 103 to contact the inner wall surface of the housing 101 as described above with reference to FIG. 4, the CPU 301 starts moving the scanner unit 103. More specifically, the CPU 301 executes control of driving by the DC motor 303 by using the target speed spdTarget and the output current limit value mtrLimit, which have been set in step S902, as parameters for the feedback control including the processing using the output current limit value mtrLimit described above with reference to the flow chart of FIG. 8. The CPU 301 executes processing in step S903 and subsequent steps according to the variation of the moving speed and the supplied current described above with reference to FIGS. 5 and 6.

In step S904, while executing monitoring to determine whether the time t (=Time_X) [sec] has elapsed since the start of moving of the scanner unit 103, the CPU 301 stores the speed information acquired from the output of the encoder sensor 305 in short time intervals.

If it is determined that the time t (=Time_X) has elapsed since the start of moving of the scanner unit 103 (YES in step S904), then the processing advances to step S905. In step S905, the CPU 301 determines whether the scanner unit 103 has been moved according to the speed information acquired so far from the encoder sensor 305. If it is determined that the scanner unit 103 has not been moved according to the speed information acquired so far from the encoder sensor 305 (NO in step S905), then the processing advances to step S910. In step S910, the scanner unit contact operation ends.

On the other hand, if it is determined that the scanner unit has been moved according to the speed information acquired from the encoder sensor 305 (YES in step S905), then the processing advances to step S906. In step S906, the CPU 301 calculates the average moving speed spdAvg [inches/sec] during the time t (=Time_X). In step S907, the CPU 301 determines whether the average speed spdAvg calculated in the above-described manner is the same as the target speed spdTarget that has been set in step S902.

If it is determined that the average speed spdAvg has approximately the same value as the value of the target speed spdTarget (YES in step S907), then the processing advances to step S909. In step S909, the CPU 301 continues the control of the driving by the DC motor 303 at the output current limit value mtrLimit, which has been set when the scanner unit contact operation starting command is given, until the scanner unit contact operation is completed.

On the other hand, if it is determined that the average speed spdAvg is not the same as the target speed spdTarget (NO in step S907), then the processing advances to step S908. In step S908, the CPU 301 sets the output current limit value mtrLimit, which has a value greater than the value set in step S902. The output current limit value mtrLimit set in step S908 is calculated as described above with reference to FIG. 6. In step S909, the CPU 301 continues the control according to the updated output current limit value mtrLimit until the scanner unit contact operation is completed.

If it is detected that the scanner unit 103 has contacted the inner wall surface of the housing 101 in step S909, then the processing advances to step S910. In step S910, the CPU 301 ends the scanner unit contact operation.

As described above, the present exemplary embodiment calculates the average speed of moving the scanner unit 103 during the predetermined time period from the start of the scanner unit contact operation, and compares the calculated average moving speed with the predetermined target speed. Furthermore, the CPU 301 executes control for updating the limit value of the current to be output to the DC motor 303. Furthermore, if it is determined that the speed of moving the scanner unit 103 has not reached the target speed, the CPU 301 supplies a current greater than the previously set value. Accordingly, the present exemplary embodiment can move the scanner unit 103 to the contact position at the increased speed.

On the other hand, if it is determined that the speed of moving the scanner unit 103 has reached the target speed, then the CPU 301 continues using the value set in step S902 for the limit value of current to be output to the DC motor 303. It is useful to set the value set in step S902 according to the performance of an individual image reading apparatus 100 whose amount of excess of torque may become the highest, considering the difference in the mechanical configuration of the image reading apparatus 100. With the above-described configuration, the present exemplary embodiment can prevent the torque from becoming too great due to excessive load on the DC motor 303. Furthermore, the present exemplary embodiment having the configuration described above can correctly detect the contacting state of the scanner unit 103 against the inner wall surface of the housing 101.

As described above, the present exemplary embodiment can execute the optimum speed control according to the actual speed of moving the scanner unit 103 of each image reading apparatus. Accordingly, the present exemplary embodiment can execute the processing for initializing the position of the scanner unit 103 as quickly and accurately as possible.

In the exemplary embodiment described above, the CPU 301 updates the output current limit value according to a result of comparison between the average speed of moving the scanner unit 103 and the target speed of moving the scanner unit 103. However, the present invention is not limited to this. More specifically, it is also useful if the CPU 301 updates (resets) the output current limit value to an optimum value according to a highest or lowest speed of moving the scanner unit 103 during a predetermined time period.

Figure 10:
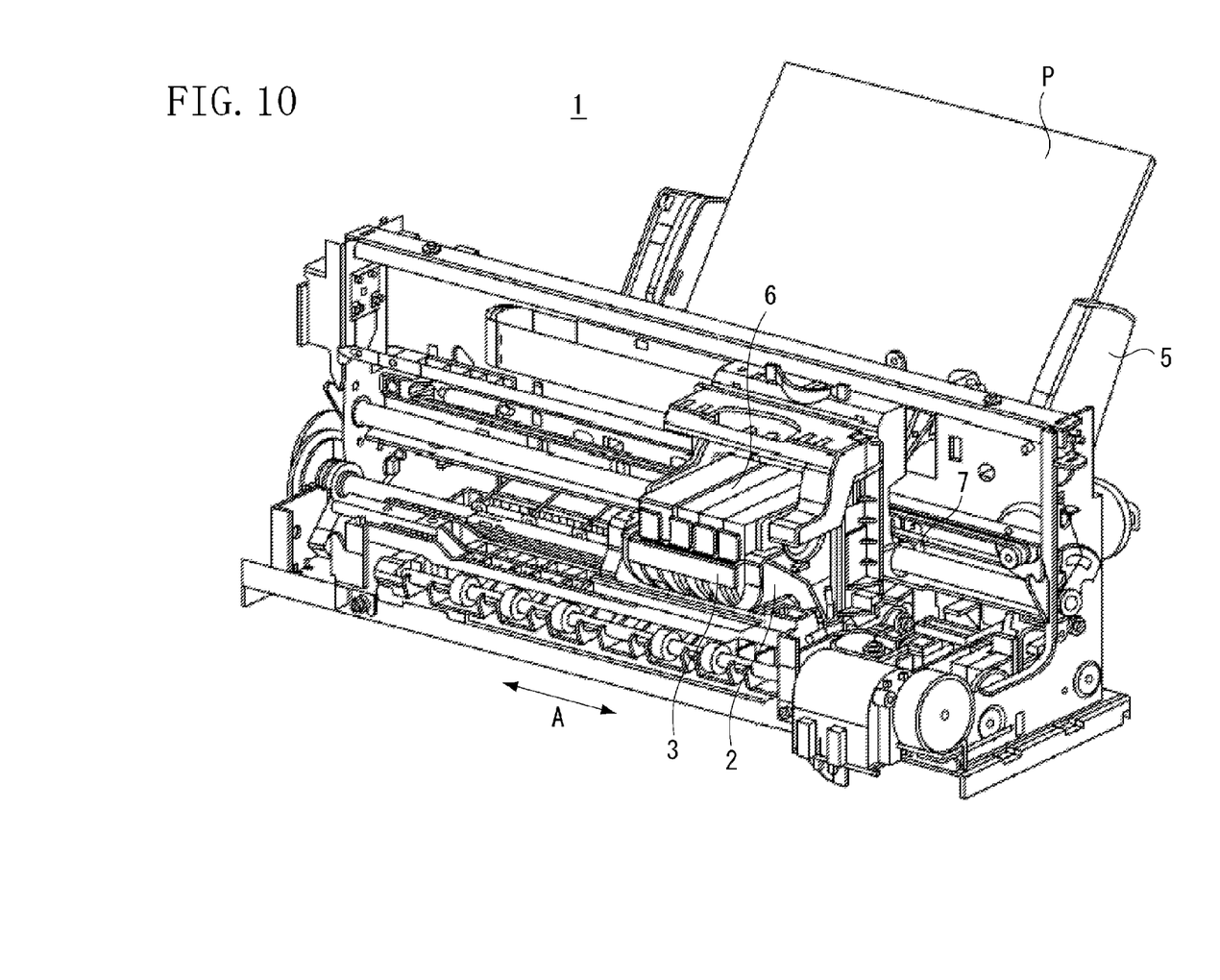
FIG. 10 illustrates an example of a mechanism of a recording apparatus.

In addition, it is also useful if a recording apparatus is used as an example of the apparatus that moves a unit to execute scanning by using a motor as a driving source. FIG. 10 illustrates an exemplary external configuration of a recording apparatus 1.

Referring to FIG. 10, the recording apparatus 1 includes a carriage 2. The carriage 2 includes an inkjet recording type recording head 3, which execute recording by discharging ink. The carriage 2 reciprocatingly moves in a direction indicated by an arrow A to execute recording. The initial position of the carriage 2 (recording head 3) is determined according to the method described above. The recording apparatus 1 feds a recording medium P, such as a recording paper, by using a paper feed mechanism 5 to a recording position. At the recording position, the recording head 3 discharges the ink on the recording medium P to execute recording.

The carriage 2 of the recording apparatus 1 includes an ink cartridge 6 in addition to the recording head 3. The ink cartridge 6 contains the ink to be supplied to the recording head 3. The ink cartridge 6 is detachably mounted in the carriage 2. The carriage 2 includes four ink cartridges, which contains a magenta (M) ink, a cyan (C) ink, a yellow (Y) ink, and a black (K) ink, respectively. Each of the four ink cartridges can be detached from the carriage 2 separately and independently from one another.

In the present invention, an inkjet type recording head, which discharges the ink by utilizing thermal energy, is employed as the recording head 3. However, the present invention is not limited to this. More specifically, it is also useful if a piezoelectric type recording head is used as the recording head 3.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An apparatus comprising:
   a current control unit configured to control supply of current to a motor being a driving source for moving a unit so that a value of the current to be supplied to the motor does not exceed a first threshold value;
   a first determination unit configured to determine whether at least one of a lowest, highest and average speed of the unit reaches a target speed during a predetermined time; and
   a setting unit configured to set a second threshold value higher than the first threshold value while the unit is being moved to an end position in a case where the at least one of the lowest, highest, and average speed of the unit is not determined to reach the target speed by the first determination unit,
   wherein, in a case where the second threshold value higher than the first threshold value is set by the setting unit, the current control unit supplies the current to the motor so that the value of the supplied current exceeds the first threshold and does not exceed the second threshold value while the unit is being moved to the end position after the predetermined time has elapsed since a start of the moving of the unit.

2. The apparatus according to claim 1, further comprising an acquisition unit configured to acquire information about a speed of the motor according to a signal output from an encoder which outputs a signal according to the movement of the unit; wherein the first determination unit determines whether a speed of the unit reaches a target speed based on the information acquired by the acquisition unit.

3. The apparatus according to claim 1, further comprising a second determination unit configured to determine whether the unit has moved to the end position, wherein the current control unit discontinues a supply of the current to the motor in a case where it is determined by the second determination unit that the unit has moved to the end position.

4. The apparatus according to claim 1, wherein the motor is a direct current motor.

5. The apparatus according to claim 1, wherein the unit includes a reading sensor configured to read an image of a document.

6. The apparatus according to claim 1, wherein the unit includes a recording head.

7. The apparatus according to claim 1, further comprising a movement control unit configured to move the unit to the end position.

8. The apparatus according to claim 7, wherein the movement control unit causes the unit to move to the end position in a predetermined direction and then to move a home position in opposite direction of the direction of movement to the end position.

9. The apparatus according to claim 7, wherein the movement control unit causes the unit to move until the value of the current of the motor reaches the first threshold value or the second threshold value.

10. The apparatus according to claim 1, wherein the first determination unit determines whether an average speed of the unit reaches the target speed.

11. A method comprising:
controlling supply of current to a motor being driving source for moving a unit so that a value of the current to be supplied to the motor does not exceed a first threshold value;
determining whether at least one of a lowest, highest and average speed of the unit reaches a target speed during a predetermined time; and
setting a second threshold value higher than the first threshold value while the unit is being moved to an end position in a case where the at least one of the lowest, highest, and average speed of the unit is not determined to reach the target speed,
wherein, in a case where the second threshold value higher than the first threshold value is set, supplying the current to the motor so that the value of the supplied current exceeds the first threshold and does not exceed the second threshold value while the unit is being moved to the end position after the predetermined time has elapsed since a start of the moving of the unit.

12. The method according to claim 11, further comprising determining whether the unit has moved to the end position, wherein the controlling step discontinues a supply of the current to the motor in a case where it is determined that the unit has moved to the end position.

13. The method according to claim 11, wherein the motor is a direct current motor.

14. The method according to claim 11, wherein the unit includes a reading sensor configured to read an image of a document.

15. The method according to claim 11, wherein the unit includes a recording head.

16. The method according to claim 11, wherein the unit is caused to move to the end position in a predetermined direction and then to move a home position in opposite direction of the direction of movement to the end position.

17. The method according to claim 11, wherein the unit is caused to move until the value of the current of the motor reaches the first threshold value or the second threshold value.

18. The method according to claim 11, wherein the determining step determines whether an average speed of the unit reaches the target speed.

19. The method according to claim 11, further comprising outputting a signal according to movement of the unit, wherein the determining step determines whether the speed of the unit reaches the target speed based on the signal output from the encoder.

* * * * *